United States Patent
Günther et al.

(10) Patent No.: US 8,066,505 B2
(45) Date of Patent: Nov. 29, 2011

(54) INJECTION-MOLDING NOZZLE

(75) Inventors: Herbert Günther, Allendorf (DE);
Siegrid Sommer, Burgwald (DE);
Torsten Schnell, Lichtenfels (DE)

(73) Assignee: Günther Heisskanaltechnik GmbH, Frankberg (DE)

( * ) Notice: Subject to any disclaimer, the term of this patent is extended or adjusted under 35 U.S.C. 154(b) by 0 days.

(21) Appl. No.: 12/578,064

(22) Filed: Oct. 13, 2009

(65) Prior Publication Data

US 2010/0092602 A1    Apr. 15, 2010

(30) Foreign Application Priority Data

Oct. 14, 2008    (DE) .......................... 10 2008 051 202

(51) Int. Cl.
*B29C 45/22* (2006.01)
(52) U.S. Cl. .......................... 425/549; 425/570; 425/572
(58) Field of Classification Search .................. 425/549, 425/562, 563, 564, 565, 566, 570, 572
See application file for complete search history.

(56) References Cited

U.S. PATENT DOCUMENTS 7,794,228 B2 *   9/2010   Catoen .......................... 425/549

FOREIGN PATENT DOCUMENTS

| DE | 102 01 830 | 8/2002 |
|---|---|---|
| DE | 10 2004 017 276 | 11/2004 |
| DE | 10 2007 027 548 | 2/2008 |
| DE | 1 938 945 | 7/2008 |
| DE | 20 2008 005 073 | 7/2008 |
| EP | 1 524 091 | 4/2005 |

* cited by examiner

*Primary Examiner* — Timothy Heitbrink
(74) *Attorney, Agent, or Firm* — Clark & Brody

(57) ABSTRACT

An injection molding nozzle comprises a material feed pipe subtending a flow duct communicating flow-wise with at least one nozzle tip. Each tip points transversely to axial direction A of the nozzle and is held by a manifold. The manifold is pluggable/insertable into the material feed pipe and includes a neck and a base. A manifold duct system is subtended in the manifold. A main duct extending the flow duct is in the neck and the base comprises a deflection site and at least one manifold duct. The manifold duct runs radially to axial direction A. The nozzle tip is affixed in a seating unit fitted with a central recess. Radial boreholes running transversely to axial direction A fit into the seating unit and receive plugged-in nozzle tips. The central recess receives the base, the nozzle tip being secured by the base to and in the seating unit.

12 Claims, 7 Drawing Sheets

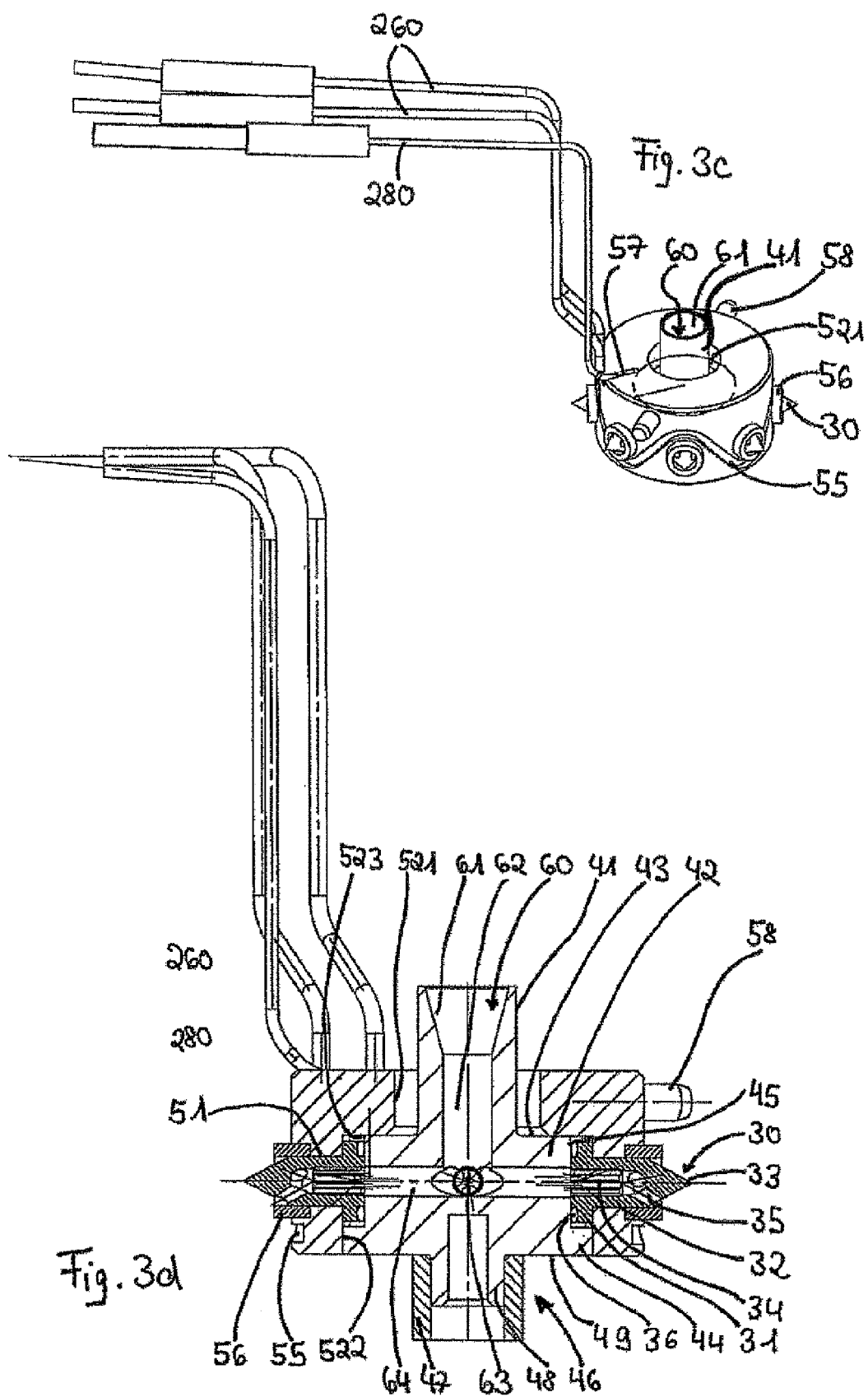

INJECTION-MOLDING NOZZLE

FIELD OF THE INVENTION

Figure 1:
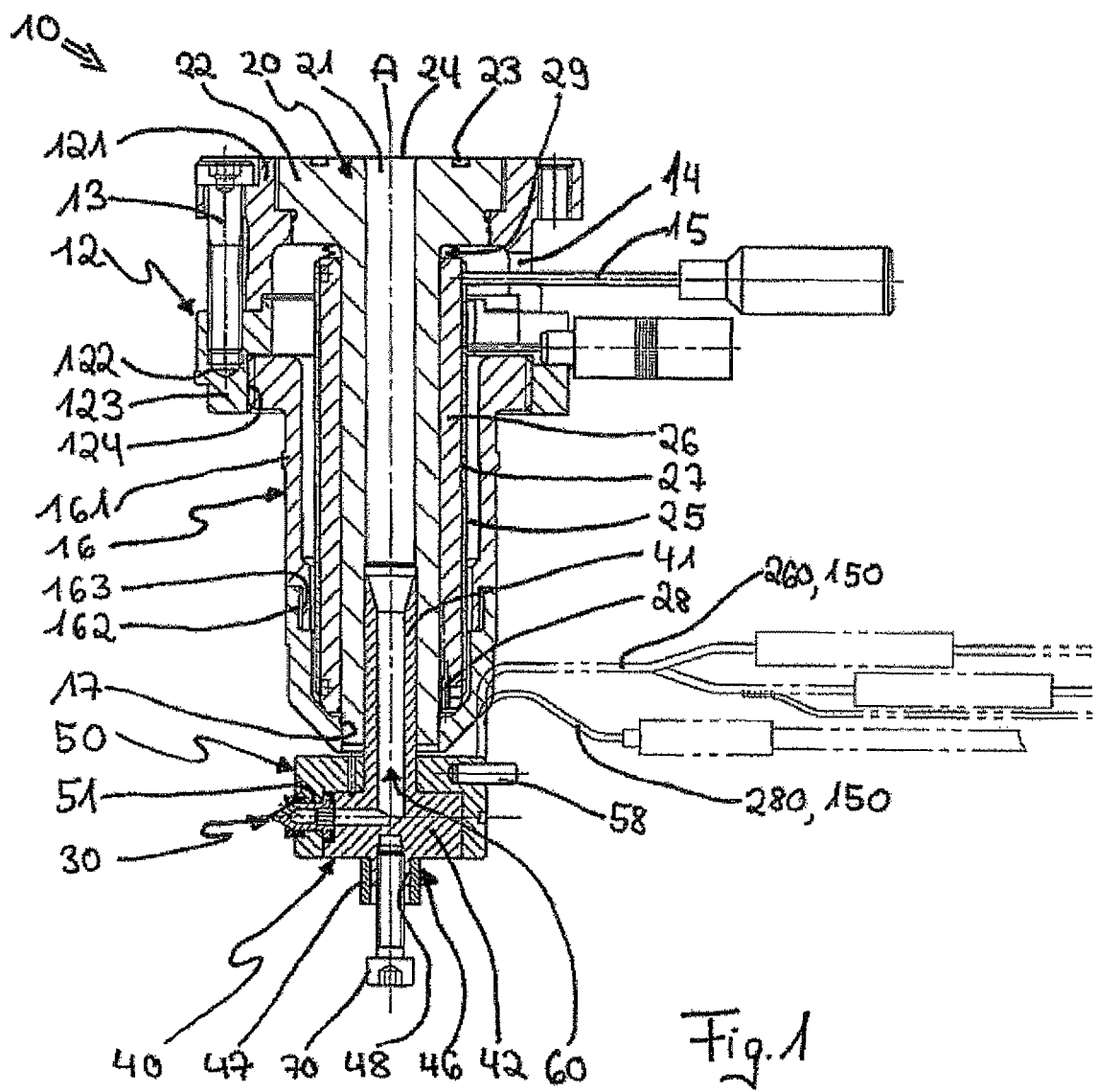

The present invention relates to an injection mold's nozzle.

BACKGROUND OF THE INVENTION

When manufacturing plastic parts using injection molding techniques, it is frequently advantageous to feed the mold cavities from the side. Appropriate injection molding nozzles and injection molds are known in various designs in the state of the art.

Illustratively the German patent document DE 20 2008 005 073 U1 discloses a hot runner nozzle for laterally gating plastic components, fitted with a multipart nozzle case subtending a melt duct which in said nozzle's lower zone branches into several partial ducts running obliquely outward. Each partial duct issues within a clearance in the nozzle case in an oblique surface supporting a tip insert. This tip insert comprises a base body with an oblique sealing surface fitted with an intake aperture for the partial duct and a cylindrical segment the end of which is designed is as the nozzle tip. The tip inserts together with the nozzle tips point radially outward. They project laterally above the circumferential nozzle case's surface and they point radially outward. A separate sealing sleeve stub is configured coaxially over each nozzle tip and seals the hot runner nozzle from the mold. A clamping plate element is screwed from below on the nozzle case to secure the tip inserts. The base bodies of said tip inserts therefore must by pressed by their sealing surfaces uniformly and hard against the oblique faces of the nozzle case.

Accordingly the design and assembly of this hot runner nozzle is fairly complex, in particular because each tip element must be individually connected to the nozzle case and be secured by the clamping plate element. As a result leaks may arise quickly, especially in the critical region of the nozzle tips and especially when the clamping plate element is improperly fitted.

The European patent document EP 1 524 091 A1 also discloses an injection mold's injection molding nozzle fitted with a material feed pipe wherein an axial flow duct terminates end-wise into several outwardly pointing deflection ducts. These deflection ducts issue into radially configured lateral recesses subtended in a sidewall of said material feed pipe. The base of said pipe contains a further polygonal recess communicating by radial boreholes with the lateral feed pipe recesses and by means of these with the feed pipe's peripheral surface. Outwardly is pointing nozzle tips are inserted in said radial boreholes and are secured within the recess by a fastener. The nozzle tips project beyond the peripheral surface of the material feed pipe and are immersed within the radial apertures by the fluidic mass issuing from the deflection ducts. Sealing sleeve stubs configured coaxially with the nozzle tips seal the feed material pipe from the mold.

In this design too the deflection ducts must be designed as oblique boreholes from below into the material feed pipe: this feature entails an elaborate manufacturing process. The just above described injection molding nozzles incur another drawback in that the number and the configuration of the nozzle tips are each fixed because they determine the number and array of the deflection ducts and communicating boreholes. As a result, the injection molding nozzle cannot be matched to diverse applications, for instance when the number and/or spacing of the gate spacings changes. Accordingly the nozzle is applicable only to certain cases, each injection mold requiring a specific material feed pipe, again entailing high costs.

In the light of the above state of the art, one objective of the present invention is to create an injection molding nozzle for an injection mold, of an alternative design, further an injection mold for such an injection molding nozzle, which shall at least partly remedy the above cited drawbacks. In particular the present invention's objective is an injection molding nozzle allowing economic manufacture using simple is means and offering flexible applicability.

As regards an injection mold's injection nozzle comprising a nozzle body or case and at least one nozzle tip, said case subtending in it a flow duct for an injection molding material to be processed and terminating at or in at least one nozzle tip and communicating flow-wise by at least one outlet aperture with a injection mold cavity subtended in a mold insert, and where each nozzle tip runs transversely to the axial direction of the nozzle case and is affixed by a fastener in its position, the present invention requires that each nozzle tip be configured in a retainer or seating unit which is designed to be separate from the nozzle case and that each nozzle tip be detachably affixed in said seating unit, the fastener extending the nozzle case's flow duct and feeding the injection molding material to be processed to at least one nozzle tip and/or to at least one outlet aperture.

This configuration allows rapidly and conveniently exchanging at will the nozzle tips without having to dismantle the full hot runner duct. Moreover the seating unit designed to be separate from the nozzle case may be exchanged as a whole. In this manner, requiring only a few manual interventions, the hot runner nozzle can be matched to diverse applications and needs. Illustratively the spacings between or is the positions of the nozzle tips may be changed at any time, or the number of nozzle tips may be conveniently increased merely by installing a matching seating unit on the nozzle. Such a step only requires removing the prior seating unit from the nozzle case and to install a new or different seating unit. Removing the entire nozzle is not needed, and savings in operating costs are gained. Also the costs involving the mold are significantly lowered because the present invention allows continuing using the remainder of the hot runner nozzle.

In one advantageous embodiment mode of the present invention, the fastener passes through the seating unit and is guided longitudinally within the nozzle case. In this way the seating unit is connected by the fastener to the nozzle case, though this connection deliberately is neither rigid nor frozen in place. Instead, the fastener is free to move relative to the nozzle case, allowing always compensating the different thermal expansions of the various nozzle elements incurred when heating/cooling the mold without leaks arising during operation.

In this respect the fastener is fitted with a neck entering the nozzle case's flow duct, said neck containing a main duct extending the nozzle case's flow duct.

Accordingly, the said fastener secures not only the nozzle tips in the seating unit. It also feeds the melt to be processed to the nozzle tips. For that purpose, sub-manifold ducts are constituted inside the fastener that communicate flow-wise with the main duct and that feed the injection molding melt to the minimum of one nozzle tip and/or to the minimum of one outlet aperture.

In this manner, the fastener constitutes not only a securing component, but simultaneously also, a manifold function whereby the melt to be processed is fed within the seating unit to the nozzle tips respectively the outlet apertures.

In one advantageous design, the said seating unit is fitted with a recess to receive said fastener. Preferably, this recess comprises a polygonal or similar inside surface, while the fastener assumes a matching side surface. The seating unit's inside surface and the fastener's outside respectively lateral surface accordingly exhibit faces that are partly smooth and plane and that allow reliably and permanently sealing the installed nozzle tips within the seating unit.

In order to receive the nozzle tips, the seating unit is fitted with boreholes running transversely to the nozzle case's axial direction so as to receive said tips by insertion or in plug-in manner. Accordingly said nozzle tips can be inserted from the inside into the seating unit, which is advantageous also in handling the injection molding nozzle. Even when space is at a premium, said nozzle can be installed in the mold because the nozzle tips usually projecting beyond the outside dimensions of the nozzle case respectively the nozzle housing can be inserted subsequently. Split mold plates are no longer needed.

During assembly, the nozzle tips are simply inserted from the recess' inside through the seating unit's radial boreholes. Then the fastener respectively the manifold is inserted from below and engages by its neck—through the seating unit—the flow duct of the nozzle case respectively a flow tube/channel or material feed pipe. A base adjoining the neck of the fastener secures the nozzle tips within the seating unit and prevents these tips from moving radially inward. Accordingly, the nozzle tips are fixed in position within the fastener by said seating unit.

In the process each nozzle tip rests within the seating unit against its inside surface and against the lateral face of said fastener, in the latter case in sealing manner by each nozzle tip. The polygonal or similar faces of the seating unit and the fastener assure optimal sealing. Additionally a seal may be fitted between each nozzle tip and the fastener to preclude melt from leaking out of these zones.

It is understood that the basic polygonal faces of the seating unit and the fastener constitute plane sealing surfaces for the nozzle tips that accordingly are always integrated into the nozzle in sealed manner. This feature offers high reliability against leaks.

To allow feeding the melt to be processed directly and at optimal temperature to the mold nest, each nozzle tip subtends a nozzle duct communicating flow-wise with a sub-manifold duct of the fastener. The sub-manifold ducts appropriately issue into the plane faces of the polygonal lateral surface of the fastener. Each nozzle tip is fitted with an outlet aperture for the injection molding material to be processed.

In order to seal the hot runner nozzle from the mold, in particular form the mold nest plates, each nozzle tip is enclosed by a sleeve stub configured between the seating unit and the mold insert.

In a further significant embodiment mode of the present invention, the said seating unit is fitted with a heater. The latter may be a conventional heating coil fitted in a nut in the outer periphery of said seating unit. Accordingly, a thick-film heater also may be used, which is deposited on one of the external faces and/or inner faces of said seating unit.

The fastener is advantageously configured in longitudinally displaceable manner in the seating unit. This feature allows adjusting the fastener and/or the nozzle tips relative to the seating unit, for instance to align the nozzle tips relative to the mold. A fastener adjusting element is used for that purpose, and preferably it shall be externally accessible.

To prevent undesirable displacements between the fastener, the nozzle case and the seating unit, advantageously the manifold and the material feed pipe respectively the seating unit and the manifold, respectively the seating unit and the material feed pipe, always shall be irrotational with each other, that is an anti-rotation or anti-twist locking device is constituted or configured between the seating unit, the fastener and/or the nozzle case.

Both the injection nozzle fastener and the nozzle tips preferably are made of a thermally well conducting substance, at least the material of the fastener exhibiting a higher thermal coefficient of expansion than the seating unit's. As a result, and on one hand, the melt is kept at an optimal temperature as far as the gate aperture. On the other hand the more expansible fastener substance assures that within the seating unit's recess, the nozzle tips shall be optimally held in place, said tips being firmly pressed within this seating unit and hence shall always rest in sealing manner against the fastener respectively the manifold element.

Further advantages are attained by combining the nozzle tips, the fastener and the seating unit into a pre-assembled unit. Such a unit permits being rapidly installed on the injection molding nozzle.

Independently of the above, said unit can be installed on any standard nozzle, for instance replacing a conventional nozzle orifice. This merely requires pushing the fasteners neck element into the end zone of the nozzle case respectively the material feed pipe of the nozzle. An arbitrary standard nozzle in this manner might be used to laterally feed mold cavities. Such a feature is especially advantageous regarding stocking and manufacturing costs.

An injection mold is appropriately fitted with an injection-molding nozzle of the is present invention. In this manner, all the advantages offered injection molding nozzle of the present invention may be used within the injection mold.

Further features, details and advantages of the present invention are defined in the claims and in the description below of an illustrative embodiment mode of an injection molding nozzle of the present invention in relation to the appended drawings.

Figure 2A:
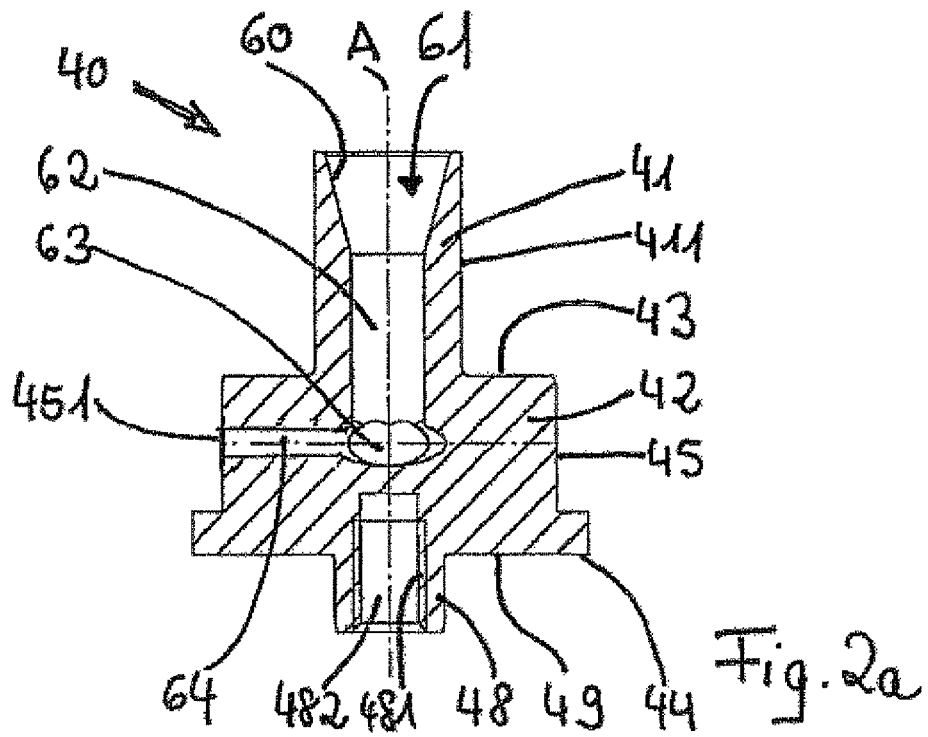
Figure 2B:
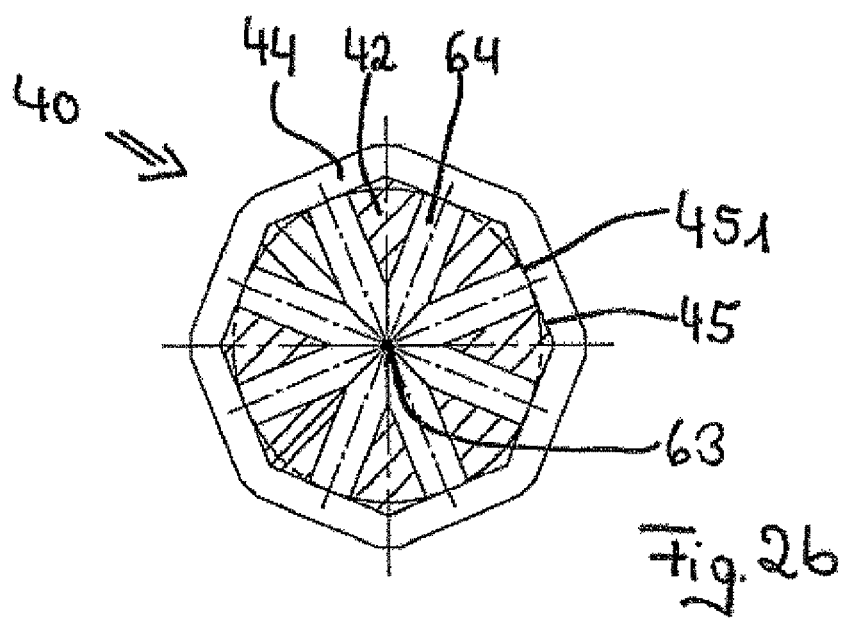
Figure 3A:
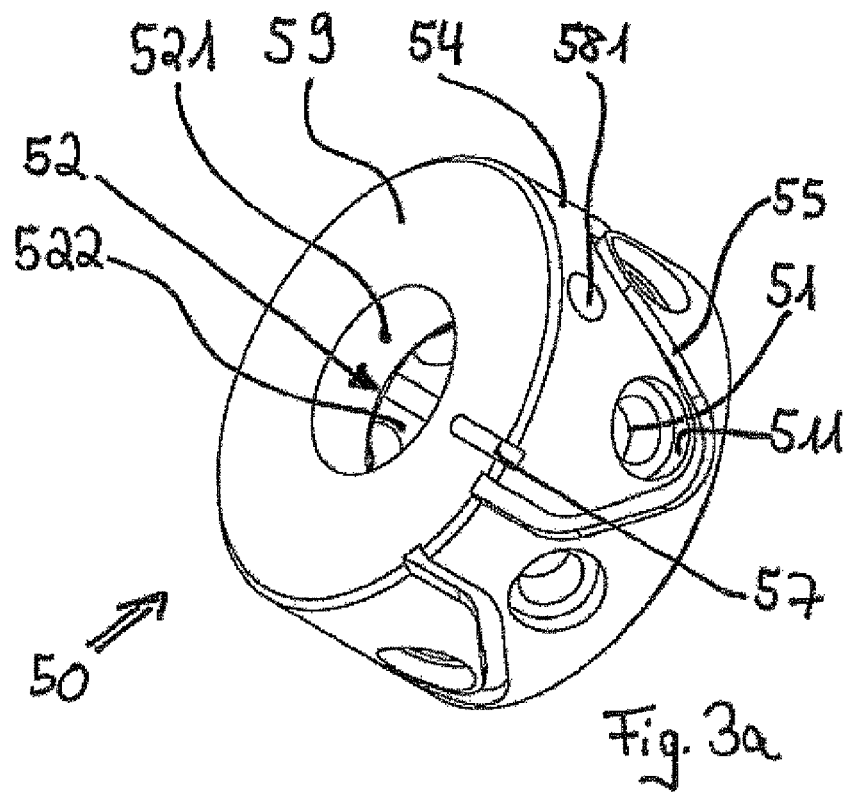
Figure 3B:
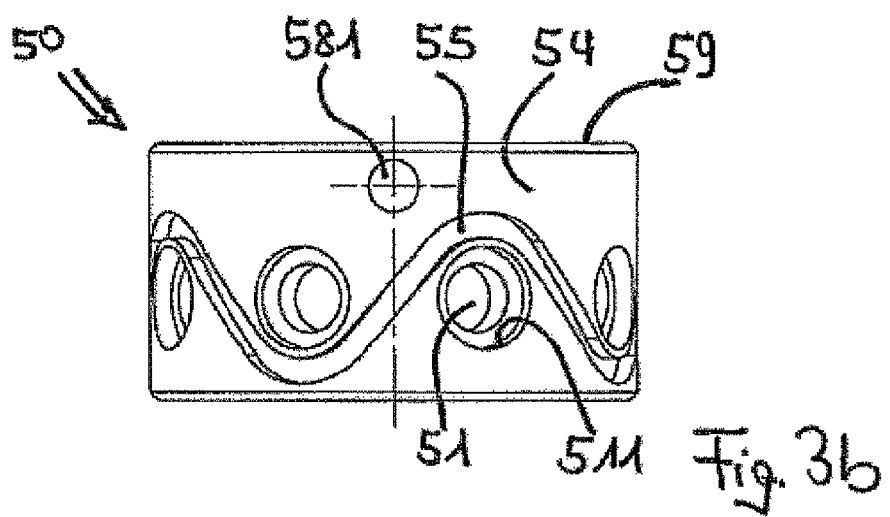
Figure 4C:
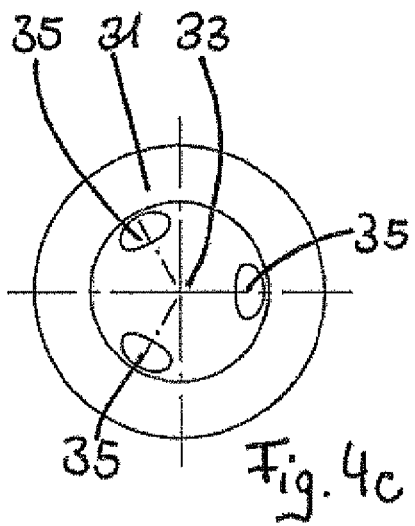
Figure 4B:
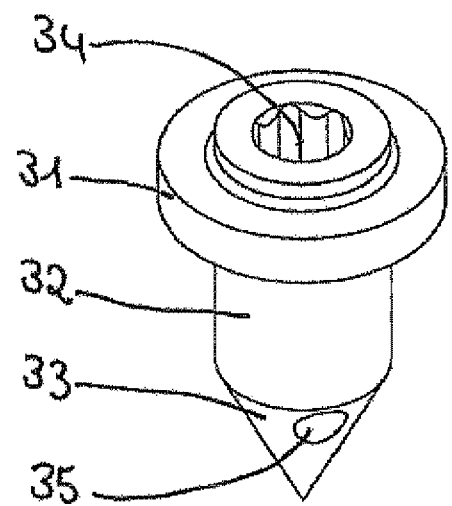
Figure 4A:
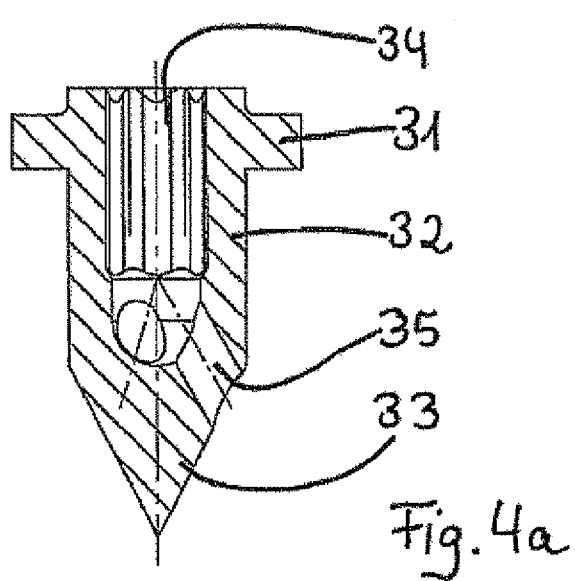
Figure 5:
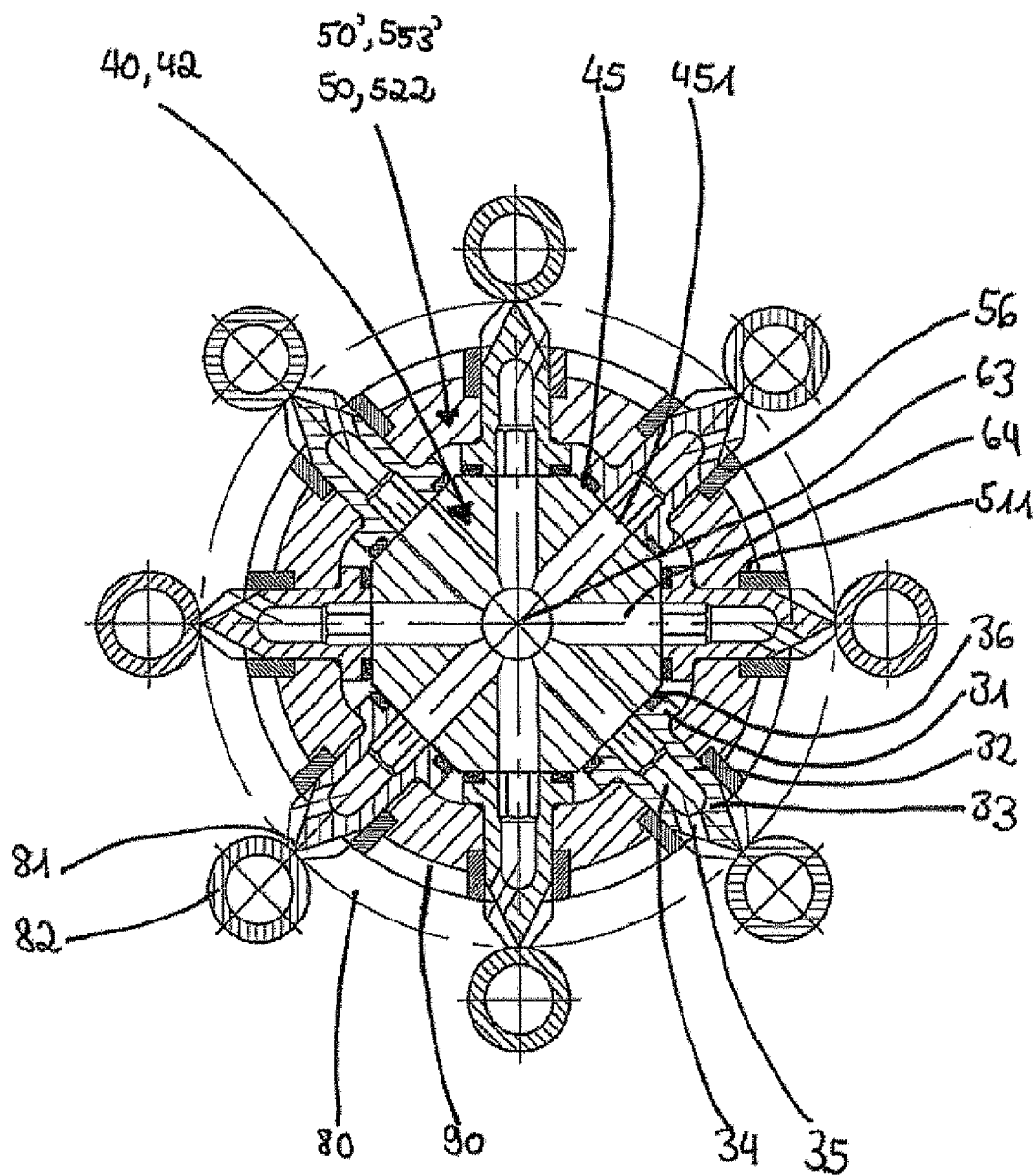
Figure 6:
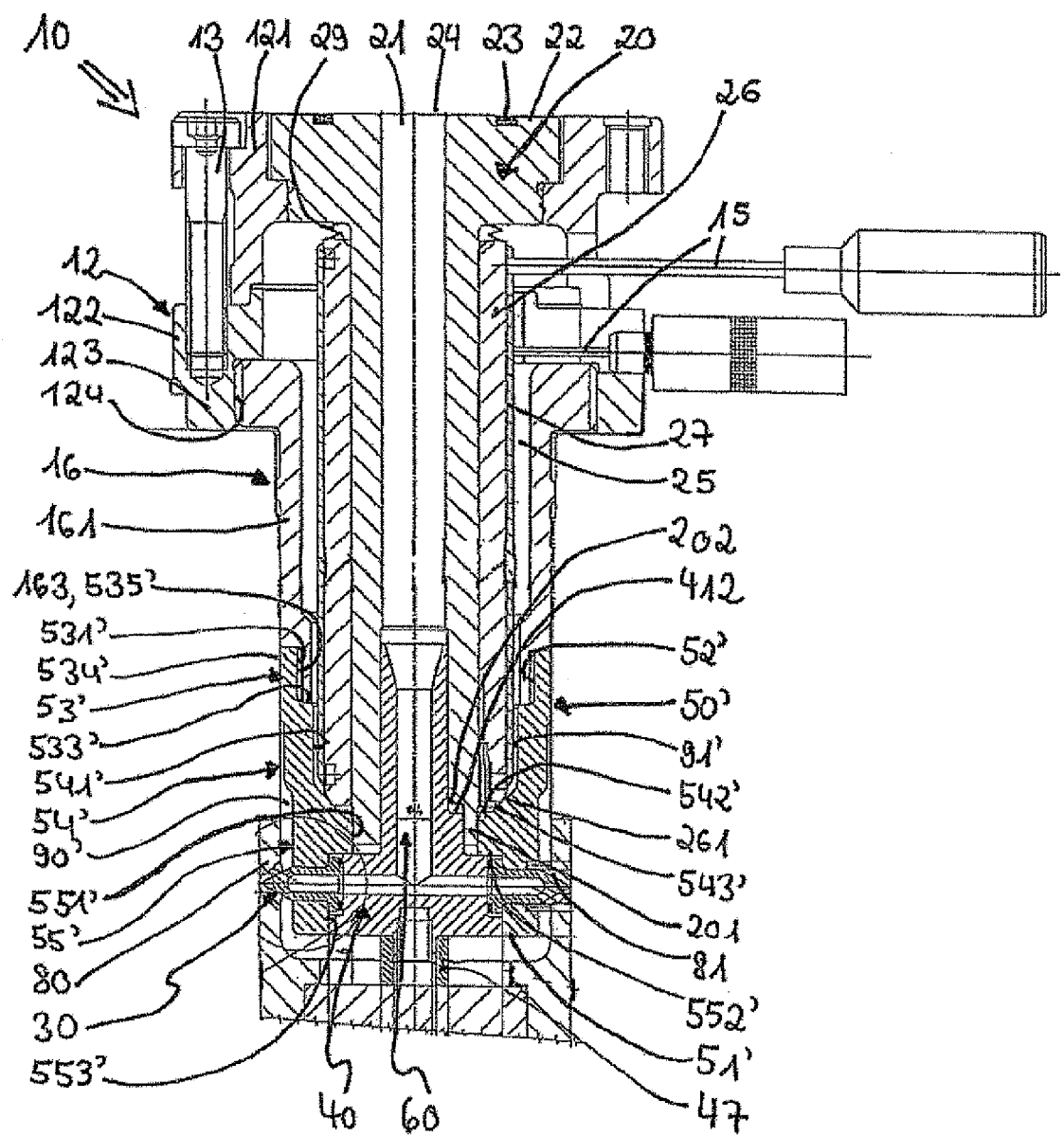

FIG. 1 is a schematic section of an injection molding nozzle embodiment mode of the present invention FIG. 2a is a detailed view of a manifold in longitudinal section, FIG. 2b is as cross-section of a base of the manifold of FIG. 2a, FIG. 3a is a full view of a seating unit, FIG. 3b is a seating unit side view, FIG. 3c is a full view of the seating unit with installed manifold and nozzle tips, FIG. 3d is a longitudinal section of the seating unit of FIG. 3c, FIG. 4a is a section of a nozzle tip, FIG. 4b is a full view of a nozzle tip, FIG. 4c is a topview of a nozzle tip, FIG. 5 is a schematic cross-section of the manifold and the seating unit of FIG. 3c in the region of the nozzle tips, and FIG. 6 is another embodiment mode of the invention molding nozzle of the present invention.

The injection molding nozzles 10 shown in FIGS. 1 and 6 are for use in an injection mold. Such a mold is used to make molded parts from a fluidic material such as a melt of plastic or the like. The injection mold conventionally comprises a clamping plate and parallel thereto a manifold plate fitted with a system of flow ducts. Said flow ducts issue into injection molding nozzles 10 illustrative designed as hot runner nozzles.

Both the injection molding nozzle shown in FIG. 1 and that shown in FIG. 6 comprise a nozzle case 20 in the form of a material feed pipe which is fitted at its end with a flange-like hookup head 22 that is sealed by a sealing ring 23 from an omitted manifold plate. The flow tube or material feed pipe 20 is situated detachably in a shaft or shank 16. The shank 16 and the hookup head 22 of the material feed pipe 20 in turn are held in place by a case 12. A melt flow duct 21 is centrally fitted into the material feed pipe 20 and runs in the axial direction A. The flow duct 21 preferably is a borehole and comprises a feed material intake aperture 24 in the hookup head 22 to feed the melt coming from the manifold plate to the flow duct 21.

A heater 26 is deposited on the external periphery of the material feed pipe 20. This heater runs over almost the full axial length of the material feed pipe 20. The heater 26 is kept it in its optimal position in the axial direction A using springs 29. In this way the heater is prevented from shifting due to thermal expansion, an eventuality with fatal consequences for the melt temperature. Also a protective tube 27 is fitted on the heater 26. Illustratively such a tube might be used to keep an omitted heating coil in its proper position. A temperature sensor 28 is used to detect the temperature generated by the heater 26 and runs as far as the end zone of the material feed pipe 20.

The case 12 receiving the shank 16, the material feed pipe 20 and the heater 26 plus the protective tube 27 is constituted in two parts. The two case parts 121 and 122 are affixed to each other by screws 13 of which only one is shown in each instance for illustration. A recess 14 passing the conductors 15 of electrical apparatus of the injection mold 10 is configured between the case parts 121, 122. Said conductors illustratively feed the heater 26 and the temperature sensor 28. The casing is divided in two for simpler assembly, in particular as regards the conductors 15. The lower case part 122 also is fitted with an end portion 123 which may be threaded (124). The shank 16 may be screwed by this thread 124 to the case 12.

The shank 16 is in two parts in the embodiment mode of FIG. 1. The upper shank part 161 is screwed into the case 12 to be affixed to it. The lower shank part 162 in turn is screwed by means of a thread 163 to the upper shank part 161. Advantageously at least the lower shank part 162 is made of a thermally poorly conducting material such as titanium. This feature insulates the heated nozzle from the mold nest which should be kept as cool as possible. Whereas an insulating air gap 25 is subtended between the heater 26 respectively the protective tube 27 and the upper shank part 161, the heater 26 and/or the hot material feed pipe 20 must inevitably come into direct contact with the lower shank part 162 in order to accurately position and keep in place the nozzle. Said shank part 162 in turn makes direct contact with the omitted mold nest. Accordingly using a thermally poorly conducting substance for the lower shank part 162 advantageously reduces heat transfer between the nozzle and the mold nest.

Be it noted that the nozzle shown in FIG. 1 is a standard hot runner nozzle. On the other hand the nozzle tip inserted into the lower end of the material feed pipe 20 is not a conventional nozzle tip but instead a fastener 40 longitudinally and displaceably entering by its neck 41 the flow duct 21 of the material feed pipe 20. The fastener 40 secures the nozzle tips 30 which are configured in a star array in a seating unit 50 constituted separately from the nozzle case respectively the material feed pipe 20.

The seating unit 50 comprises a downwardly open recess 52 receiving the nozzle tips 30 and the fastener 40. Said fastener consists of the neck 41 and a base 42. Whereas the neck 41 is configured in longitudinally displaceable manner in the is flow duct 21 of the material feed pipe 20, the base 42 is enclosed by the seating unit 50. The seating unit 50 is fitted with radial boreholes 51 receiving nozzle tips 30. Nozzle ducts and tip ducts 34, 35 are subtended in the nozzle tip 30 and guide the melt as far as the omitted gate aperture. The nozzle tips 30 are configured transversely to the axis A of the injection molding nozzle 10 and communicate flow-wise through the manifold 40 with the flow duct 21 of the injection molding nozzle 10.

The retainer or seating unit 50 can be heated by a separate heater 59, for instance a heating coil 260, the temperature being monitored by a further temperature sensor 280 The heater 59, 260 and the temperature sensor 280 of the seating unit 50 are fed from separate electric connectors or outlets 150.

To properly position the nozzle tips 30 relative the mold cavities (omitted) to be injected, the manifold 40 is axially adjusted by a threaded bolt 70 engaging an adjustment muff 48 in the manifold 40. Another bolt 58 inserted into the seating unit 40 may engage a recess (also omitted) in the mold nest and in this manner, acting as an irrotationality means, prevents rotation about the axis A by the sub-assembly composed of the nozzle tips 30, manifold 40 and seating unit 50. The seating unit 50 at the same time is fixed in height, as a result of which the nozzle tips 30 always shall be situated centrally above the particular associated gate aperture. The required length compensation of the nozzle 10 when heating/cooling the mold is implemented by the neck 41 of the fastener 40 guided in sliding manner in the flow is duct 21 of the nozzle case respectively the material feed pipe 20.

It follows that said sub-assembly of nozzle tips 30, manifold 40 and seating unit 50 illustratively may be used instead of a nozzle orifice in an arbitrary standard nozzle. Hence, one of the special advantages offered by the present invention is that the melt flow of a standard nozzle may be enabled in a manner that lateral gating of several mold cavities is enabled.

Moreover and as shown in FIG. 2a, the manifold 40 comprises a manifold duct system 60. It serves to deflect the melt flow from the axial direction into a direction transverse to the axis A. Said system begins with a conical intake funnel 61 which extends the flow duct 21 of the material feed pipe and which in turn is extended by a manifold main duct 62. Both the intake funnel 61 and the manifold main duct 62 are constituted in the neck 41 of the manifold 40. The manifold main flow duct 62 continues into the base 42 and issues approximately centrally in latter at a deflection site 63. At least one sub-manifold duct 64 issues from said site 63. The sub-manifold ducts 64 run transversely to the axial direction A. FIG. 2b shows that they are preferentially configured in a star array. The base 42 exhibits a polygonal basic surface. One of the sub-manifold ducts 64 issues from an outlet aperture 451 at each lateral face 45 of the polygon.

FIG. 2a moreover shows that the neck 41 preferably is centrally configured on the base 42. Also, advantageously, the external side 411 of the neck 41 is made is congruent with the inside diameter of the flow duct 21, for instance being cylindrical. In this manner the neck 41 may be inserted in longitudinally displaceable manner into the flow duct 21 whereby it shall be geometrically interlocking with the material feed pipe 20 and seal it when the operational temperature is reached.

The base 42 on the other hand is disk-like. It comprises a top side 43, a lower side 49 and at least one lateral face 45. The lateral faces 45 may be bent or, as described above and shown in FIG. 2b, preferably be straight. In the second instance the base 42 exhibits a polygonal cross-section (FIG. 2b). In any event, the external geometry of the base 42 matches the inside shape of the seating unit 50. A flanged rim 44 is subtended at the lower side 49 of the base 42. The neck 41 is configured preferably centrally on the top side 43.

Advantageously the manifold 40 is made of a thermally well conducting substance.

The base 42 of the manifold 40 is enclosed by the seating unit 50 shown in FIGS. 3*a*, 3*b*, 3*c*. This seating unit assumes the general shape of a flat cylinder. It comprises a central borehole 52 in two parts 521 and 522. It receives the manifold 40. The radial boreholes 51 receive the nozzle tips 30 and are subtended in a side surface 54 of the seating unit 50.

A groove 55 is fitted into the side surface 54 to receive the heating coil 260. Said groove 55 snakes around the radial boreholes 51. As a result, the seating unit is 50 is advantageously kept at a uniform temperature. The seating unit therefore not only positions the nozzle tips 30 but also heats the manifold 40 and said nozzle tips. In especially advantageous manner, as in the present embodiment, the heating of the seating unit 50 is independent of the heating of the material feed pipe 20.

Furthermore, a borehole 581 receiving anti-rotation bolt 58 and a notch 57 receiving the temperature sensor 280 are fitted into the side surface 54.

A widened section 511 may be present near the outside of each radial borehole 51. As indicated in FIGS. 3*c* and 3*d*, sleeve stubs 56 may be inserted into said widened sections 511, preferably being pressed into them. Preferably, the sleeve stubs 56 are made of a thermally poorly conducting substance, preferably titanium. By means of said sleeve stubs, the heat transfer between the heated seating unit 50 and the mold nest in contact with the assembled sleeve stubs 56 shall be minimized.

FIGS. 3*a* and 3*b* show that the first portion 521 of the central borehole 52 also is cylindrical. The second portion 522 matches the structure of the base 42 of the manifold 40 (FIG. 5).

When the sub-assembly is assembled, the nozzle tips 30 are inserted through the radial boreholes 51 and the manifold 40 is inserted from below into the central borehole 52 of the seating unit 50 (FIGS. 3*c* and 3*d*). The neck 41 of the manifold 40 projects through the first portion 521 and accordingly it can be inserted into the material feed pipe 20 of the injection molding nozzle 10. The base 42 on the other hand is entirely enclosed by the second portion 522. Said base rests by its surface 43 against an offset 523 subtended between the first and second portions 521, 522. A seal is advantageously created in this manner between the manifold 40 and the seating unit 50.

It follows that each outlet aperture 451 of the manifold 40 is linearly aligned with and extended by the nozzle duct 34 of a nozzle tip 30. At the same time, when in its operational state, the manifold 40 presses by its side face 45 from the inside of the second borehole portion 522 against the nozzle tips 30 which thereby are prevented from dropping out.

Simultaneously this design implements sealing between the nozzle tips 30 and the manifold 40, whereby undesirable melt leakage is precluded between these components. Said leakage suppression is further enhanced by seals 36 that may be configured in the zone of a flange collar 31 of the nozzle tip 30. Illustratively such flanged collars may be metal O-rings or the like.

Be it noted that the nozzle tips 30 each include a short tube 32. Preferably the diameter of said short tube is selected so that it shall rest in sealing manner in the radial borehole 51 as the operational temperature is reached. The flanged collar 31 rests against the inside of the borehole portion 522 and prevents the nozzle tip 30 from slipping deeper than desired into the radial borehole 51.

Accordingly, the fastener 40 acts as a manifold for the nozzle tips 30. Moreover the nozzle ducts 34 communicate flow-wise, by means of the manifold ducts 64, the deflection site 63 and the main duct 62, hence also by means of the manifold system 60, with the flow duct 21.

In the operational state, the flanged rim 44 of the manifold 40 very accurately terminates underneath the flanged collars 31 of the nozzle tips with the seating unit 50. In especially advantageous manner, the flanged collar 31 as well as the base 42 and the second borehole portion 522 are fitted with a bottom polygonal surface. With such a design, the manifold 40 when installed no longer may be rotated relative to the seating unit 50. As a result the manifold ducts 64 shall issue with utmost accuracy into the nozzle ducts 34.

FIG. 3*d* also shows that the adjusting muff 48 rotatably rests within a support sleeve 47 on the omitted mold nest. Preferably, this support sleeve 47 is made of a thermally poorly conducting substance such as titanium. In this manner the heat transfer between the hot manifold 40 and the cool mold nest is minimized to the extent possible. This Figure also indicates that the adjusting muff 48, the support sleeve 47 and the bolt 40 threadable into said adjusting muff constitute an adjustment device 46. Using said adjustment device 46, the manifold 40 may be rotated about the axial direction A until the nozzle tips 30 assume their optimal position relative to the gate apertures 81 (FIG. 5). The seating unit 50 and the material feed pipe 20 may be co-rotated. The entire sub-assembly may be affixed in an axial direction at the same time.

Detailed views of the nozzle tips of FIGS. 4*a*, 4*b* and 4*c* indicate that each nozzle tip 30 is fitted with a flanged collar 31, a short tube 32 and a tip 33. The short tube 32 contains a nozzle duct 34 issuing in the tip zone into at least one tip duct 35. Advantageously the nozzle ducts 34 assume at last partly an inner hexagonal geometry as shown in FIGS. 4*a* and 4*b*. In this manner the nozzle tips 30 when being installed may be held and moved for instance using a hexagonal wrench, such a feature being especially advantageous when the nozzle tips must be pried off a solidified melt and be disassembled.

The nozzle ducts 34 communicate flow-wise by means of the manifold 40 with the flow duct 21 of the material feed pipe 20. They are extended by the tip ducts 35 that guide the melt into the particular gate 81 (FIG. 5) and from there into the mold cavity 82. Preferably, the nozzle tips 30 are made of a thermally conducting substance. In that manner the melt shall be at its optimal temperature if possibly directly as far as the mold nest.

FIG. 5 shows the star-array of eight nozzle tips 30 in a seating unit 50. Said seating unit my be of the type denoted by 50 or as well a seating unit 50' discussed is further below such as used in the embodiment of FIG. 6. As indicated, the base 42 of the manifold 40 is forced against the end which is on the flange collar side of the nozzle tips 30. As a result said tips are kept in the radial boreholes 51 of the seating unit 50, 50'. Further FIG. 5 shows clearly that the borehole portion 522, 553' of the seating unit 50, 50'—which receives the base 45—and the base 42 of the manifold 40 assume the same basic shape, namely being octagonal in the shown illustration.

The manifold ducts run in a starry pattern from the deflection site 63 to the outlet apertures 451 fitted into the side faces 45 of the base 42. The nozzle ducts 34 adjoin in straight lines the outlet apertures 451. In turn said nozzle ducts are extended by the tip ducts 35. The latter each issue into a gate aperture 81 constituted in the mold nest 80. One gate 81 is constituted in the mold nest 80 for each nozzle tip 30. The end 33 of the nozzle tip 30 may project into the gate 81 or even beyond it.

An air gap 90 is subtended between the seating unit 50 and the mold nest 80. To seal off said air gap 90 from any melt, sleeve stubs 56 are configured between the seating unit 50 and the particular gate aperture 81. Said sleeve stubs preferably are made of a thermally poorly conducting substance. They are pressed into the widened elements 511 of the radial boreholes 51. Besides acting as seals, the sleeve stubs 56 may also be used to center and laterally align the injection molding nozzle 10 in the mold nest 80.

The embodiment variation of the injection molding nozzle 10 shown in FIG. 6 is enclosed at its lower region by a seating unit 50'. Said seating unit 50' replaces the lower shank part 162 of the standard nozzle shown in FIG. 1. The seating unit 50' comprises an upper portion 53', a middle portion 54' and a lower portion 55'. A stepped axial borehole 52' is subtended within the seating unit 50' and also consists of several borehole portions 531', 541', 551', 553'.

The uppermost borehole portion 531' is also fitted into the upper portion 53' of the seating unit 50'. Said portion 531' is bounded by a first offset 533' subtended between the upper and middle portions 53', 54'. The shank part 161 may rest by its lower end on said offset 533' when the nozzle has reached the operational temperature. Moreover, the uppermost borehole portion 531' may be fitted with a thread 535' that can mesh with the thread 163 of the lower end of the shank part 161. This feature allows screwing the seating unit 50' to the shank 16. Also the outer wall 534' of the uppermost portion 53 is dimensioned in a way that by means of said wall an air gap 90' subtended between the seating unit 50' and mold nest 80 can be sealed off when the operating temperature has been reached.

A borehole portion 541' also is constituted in the middle portion 54' of the seating unit 50'. The diameter of the borehole portion 541' is less than that of the uppermost borehole portion 531' and terminates into a wider offset 542'. In its lower zone it may conically taper toward the offset 542'. The borehole portion 541' in the middle portion 54' includes the lower end of the heater 26 and of the protective tube 27. As a result however, an additional insulating air gap 91' has been subtended between the inside wall of the seating unit 50' and the insulating tube 27'. Said air gap 91' prevents the seating unit 50' from being heated by the heater 26. The Figure shows that the heater 26, which is fitted with a slight bevel 261 at its lowermost end, is forced by the springs 29 against the conical surface 543'.

The lower portion 55' of the seating unit 50' includes two borehole portions 551', 553'. The former borehole portion 551' exhibits the smallest diameter of all four borehole portions 531', 541', 551', 553'. It comprises the lower end 201 of the material feed pipe 20 which, in the shown embodiment variation, is no longer enclosed by the heater 26.

A further offset 552' constitutes the transition to the second borehole portion 553'. Radial boreholes 51' are fitted into the region of said offset 552' and serve to receive nozzle tips 30.

The radial boreholes 51' may be fitted with a widened section 511' at their side facing the mold nest 80. A sleeve stub 56' may be inserted into said widened section 511'. In the operational state, the sleeve stub 56' spans the air gap 90' between the seating unit 50' and mold nest 80. Accordingly said sleeve stub constitutes an additional seal. It contributed to allowing the melt to reach only the region of the gate 81 and farther into the mold cavity, but not into the insulating air gap 90' between the seating unit 50' and the mold nest 80.

Similarly to the preceding illustrative embodiment mode, the nozzle tips 30 are inserted from the second borehole portion 553' through the radial boreholes 51'. Preferably the diameter of the short tube 32 is selected in a manner that said short tube 32, when reaching the operational temperature, shall rest in sealing manner in the radial borehole 51'. The flanged collar 31 rests on the inside of the borehole portion 553' and precludes the nozzle tip 30 from slipping excessively deeply into the radial borehole 51'.

The nozzle tips 30 are also prevented, by means of the manifold 40, from dropping toward the inside of the borehole portion 553'.

The embodiment mode variation shown in FIG. 6 furthermore comprises a second anti-rotation device in the region of the neck 41 of the manifold 40. This second anti-rotation device is a unilateral protrusion 412. It engages a matching recess 202 in the material feed pipe 20. Accordingly the entire manifold 40, hence also the seating unit 50, is made irrotational relative to the material feed pipe 20.

In this embodiment too, the manifold 40 when being installed is inserted in such a way into the material feed pipe 20 and the seating unit 50' that each outlet aperture 451 is extended from the nozzle duct 34 of a nozzle tip 30 in linearly aligned manner. In the process, when in the operational state, the manifold 40 presses by its side surface 45 from the inside of the second borehole portion 553' against the is nozzle tips 30, thereby preventing these tips from dropping out.

In this manner too, sealing is attained simultaneously between the nozzle tips 30 and the manifold 40, as a result of which melt leakage between these components is prevented. Such leakage suppression moreover is additionally supported by seals 36 that may be configured in the region of the flanged collar 31. Such additional means may be metal O-rings or the like.

Accordingly in this embodiment too, the manifold 40 acts like a fastener for the nozzle tips 30. It is clear furthermore that the nozzle ducts 34 communicate flow-wise—through the manifold ducts 64, the deflection site 63 and the main duct 62, hence also through the manifold duct system 60—with the flow duct 21.

The present invention is not restricted to one of the above-described embodiment modes, rather it may be modified in many ways.

Illustratively the melt might be guided from the manifold ducts 64 into the radial boreholes 51 to flow around the nozzle tips 30.

The heater 26 may be a thick film heater.

Where the heater 26 includes a heating coil, the protective tube 27 may serve to keep the heating coil in its guide groove. The protective tube 27 also may act as an insulating layer.

The manifold ducts 64 may be configured at an arbitrary angle to the axial direction A.

Conceivably too, the nozzle tips 30 may be configured only on one side of the injection molding nozzle 10. In that case the corresponding mold cavities then need be configured also only on one side. Again, such configurations also may be in several arcuate portions on two or more sides of the nozzle 10.

The nozzle tips 30 together with the gate apertures 81 may constitute one open gate.

Conceivably too, absent any thread, the seating unit 50' may be merely plugged into the lower end If the shank part 162.

An adjusting muff 48 may be made as a separate component.

The seating unit 50, 50' may be a heater 26.

As regards an injection molding nozzle 10 for an injection mold, comprising a material feed pipe 20 subtending a flow duct 21 communicating flow-wise with at least one nozzle tip 30, where each nozzle tip 30 is arrayed transversely to the axial direction A of the nozzle 10 and is fixed in position by a fastener, it follows from the above disclosure that said fastener advantageously shall be a manifold 40. The manifold 40 is insertable in longitudinally displaceable manner into the material feed pipe 20 and comprises a neck 41 and a base 42. A manifold duct 60 is subtended in the manifold 40, the neck 41 comprising a main duct 62 extending the flow duct 21, a deflection site 63 being configured in the base 42 and said base also being fitted with at least one manifold duct 64. The manifold ducts 64 run radially relative to the axial direction A.

Be it borne in mind that the nozzle tips 30 may be affixed in a seating unit 50 which is fitted with a central recess 52. Radial boreholes 51 run transversely to the axial direction A in said seating unit 50 and receive the nozzle tips 30. The central recess 51 receives the base 42 of the fastener 40, the nozzle tips 30 being detachably affixed by the base 42 in the seat 50.

The fastener 40 includes a neck 41 entering the flow duct 21 of the nozzle case 20, said neck 41 subtending a main duct 62 extending the flow duct 21 of the nozzle case 20 within the fastener 40 and feeding the injection molding material to be processed by means of the sub-manifold ducts 64 subtended in the fastener to the minimum of one nozzle tip 30 and/or to the minimum of one outlet aperture 35. Accordingly the fastener 40 constitutes a manifold fitted with a manifold duct system 60.

Again be it borne in mind that a nozzle duct 34 is fitted into at least one nozzle tip 30 and that the nozzle ducts 34 of the particular nozzle tip 30 communicates flow-wise by means of the manifold duct system 60 with the flow duct 21. Advantageously a seal 36 is fitted between each nozzle tip 30 and the manifold 40.

Furthermore the manifold 40 comprises an adjusting device 46 to align the nozzle tips 30 and the gate openings 81 with each other. Advantageously too the manifold 40 and the material feed pipe 20 are configured irrotationally with respect to one another, as also are the seating unit 50 and the manifold 40 and the fastener 50 and the material feed pipe 20. In every case the manifold 40 advantageously shall be made of a thermally well conducting substance.

All features and advantages explicit from and implicit in the claims, the specification and the drawings, inclusive design details, spatial configurations and procedural steps, may be construed being inventive per se or in the most diverse combinations.

LIST OF REFERENCES

A axial direction
10 injection molding nozzle
12 case
121 case part
122 case part
123 end portion
124 thread
12 screw
14 recess
15 conductor(s)
150 electrical hookup
16 shank
161 upper shank part
162 lower shank part
163 thread
20 material feed pipe
201 lower end
202 recess
21 flow duct
22 hookup head
23 sealing ring
24 material feed aperture
25 air gap
26 heater
260 heating coil
261 bevel
27 protective tube
28 temperature sensor
280 temperature sensor
29 spring
30 nozzle tip
31 flanged collar
32 short tube
33 tip
34 nozzle duct
35 tip duct
36 seal
40 fastener
41 neck
411 outer side
412 protrusion
42 base
43 top side
44 flanged rim
45 side face
451 outlet aperture
46 adjusting device
47 support sleeve
48 adjusting device
49 lower side
50 seating unit
51 radial borehole
511 widened section
52 recess
521 portion
522 portion
523 offset
524 inside face
54 side surface
55 groove
56 sleeve stub
57 notch
58 bolt
581 borehole
59 heater
50' seating unit
51' radial borehole
511' widened section
52' recess
524' inside surface
53' upper portion
531' boring portion
533' offset
534' outer wall
535' thread
54' middle portion
541' borehole portion
542' offset
543' surface
55' lower portion
551' borehole portion
552' offset
553' borehole portion
56' sleeve stub
60 manifold system
61 intake funnel
62 manifold main duct
63 deflection site
64 sub-manifold duct
70 threaded bolt 80 mold nest
81 gate aperture
82 mold cavity
90 air gap
90' air gap
91 air gap

The invention claimed is:

1. An injection molding nozzle (10) for an injection mold, comprising:
   a) a nozzle body (20) having a flow duct (21) for an injection molding material to be processed, said flow duct (21) terminating at or in the minimum of one nozzle tips (30) and communicating flow-wise via at least one outlet aperture (35) with an injection mold cavity subtended in a mold insert;
   b) a fastener (40) for the nozzle tips (30) extending the flow duct (21) of the nozzle body (20) and feeding the injection molding material to be processed to the minimum of one nozzle tips (30) and/or to the at least one outlet aperture (35), and
   c) a retainer (50, 50') which is separate from the nozzle body (20), said retainer (50, 50') having boreholes (51, 51') receiving the at least one nozzle tip (30), and a recess (52, 52') receiving the fastener (40);
   d) wherein each nozzle tip (30) is detachably affixable by the fastener (40) in the separate retainer (50, 50');
   e) wherein said fastener (40) projects through the retainer (50, 50') and is guided longitudinally in the nozzle body (20), the fastener (40) having a neck (41) entering the flow duct (21) of the nozzle body (20) in a longitudinally displaceable manner;
   f) wherein the boreholes (51, 51') of the retainer (50, 50') for the nozzle tips (30) and each nozzle tip (30) being aligned transversely to the axial direction (A) of the nozzle body (20);
   g) said neck (41) of the fastener (40) having a main duct (62) extending into the flow duct (21) of the nozzle body (20), and
   h) the fastener (40) having sub-manifold ducts (64) communicating flow-wise with the main duct (62) and feeding injection melt to be processed to the minimum of one nozzle tips (30) and to the at least one outlet aperture (35);
   i) said at least one nozzle tip (30) having a nozzle duct (34) and at least one of the outlet apertures (35) for the molding material to be processed, said nozzle duct (34) communicating flow-wise with the sub-assembly duct (64) of the fastener (40);
   j) wherein each nozzle tip (30) rests within the recess (51, 52') and against the inside surface (524, 524') of the retainer (50, 50') and against the a side face (45) of the fastener (40), each nozzle tip (30) resting in a sealing manner against said side face (45) of the fastener (40); and
   k) wherein each nozzle tip (30) is coaxially enclosed by a sleeve stub (56) configured between the retainer (50, 50') and the mold insert, each sleeve stub (56) rests against a face of a widened section (511) of the borehole located at the outside of the borehole (51).

2. The injection molding nozzle as claimed in claim 1, characterized in that the recess (52, 52') is fitted with a polygonal or similar inside face (524) and in that the fastener (40) is fitted with a congruent polygonal or similar side face (45).

3. The injection molding nozzle as claimed in claim 1, characterized in that the retainer (50, 50') is fitted with a heater (59).

4. The injection molding nozzle as claimed in claim 1, characterized in that the fastener (40) is configured in longitudinally displaceable manner in the retainer (50, 50').

5. The injection nozzle as claimed in claim 1, characterized in that it comprises an adjusting device (46) for the fastener (40).

6. The injection molding nozzle as claimed in claim 1, characterized in that an anti-twist locking device is fitted between or mounted on the retainer (50, 50'), the fastener (40) and/or the nozzle body (20).

7. The injection molding nozzle as claimed in claim 1, characterized in that the fastener (40) is made of a thermally well conducting substance.

8. The injection molding nozzle as claimed in claim 1, characterized in that the nozzle tips (30), the fastener (40) and the retainer (50, 50') constitute a pre-assembled sub-assembly.

9. An injection mold fitted with an injection molding nozzle (10) as claimed in claim 1.

10. The injection molding nozzle as claimed in claim 1, wherein said seating unit (50, 50') has an anti-twist rotation device (58) fitted between or mounted on the retainer (50, 50') and the mold insert; the anti-twist rotation device (58) having an anti-rotation bolt (58) and the retainer (50, 50') having a borehole (581) receiving the anti-rotation bolt (58).

11. The injection molding nozzle as claimed in claim 1, wherein each sleeve stub (56) is made of a thermally poorly conducting substance.

12. The injection molding nozzle as claimed in claim 1, wherein each sleeve stub (56) has a front end being in touch with the mold insert and spans an air gap between the retainer (50, 50') and the mold insert.

* * * * *